(12) United States Patent
Alvarez (10) Patent No.: US 8,105,459 B2
(45) Date of Patent: Jan. 31, 2012

(54) METHOD AND APPARATUS FOR PRODUCING LABELED, PLASTIC FOAM CONTAINERS, AND PRODUCT OF SAME

(75) Inventor: Benito Alvarez, Puebla (MX)

(73) Assignee: Grupo Convermex, S.A. de C.V., Puebla Pue (MX)

( * ) Notice: Subject to any disclaimer, the term of this patent is extended or adjusted under 35 U.S.C. 154(b) by 114 days.

(21) Appl. No.: 12/729,982

(22) Filed: Mar. 23, 2010

(65) Prior Publication Data

US 2011/0011523 A1    Jan. 20, 2011

Related U.S. Application Data (63) Continuation of application No. 11/227,124, filed on Sep. 16, 2005, which is a continuation of application No. PCT/IB2004/003517, filed on Oct. 1, 2004, now abandoned.

(60) Provisional application No. 60/510,519, filed on Oct. 14, 2003, provisional application No. 60/507,944, filed on Oct. 3, 2003.

(51) Int. Cl.
*B29C 44/06* (2006.01)

(52) U.S. Cl. ........... 156/308.2; 156/309.6; 156/309.9; 156/321; 156/86; 156/556; 156/566; 156/567; 156/569; 156/DIG. 36

(58) Field of Classification Search ............. 156/556, 156/566, 567, 569, DIG. 36, 308.2, 309.6, 156/309.9, 321, 86
See application file for complete search history.

(56) References Cited

U.S. PATENT DOCUMENTS

| | | |
|---|---|---|
| 3,290,198 A | 12/1966 | Lux et al. |
| 3,759,437 A | 9/1973 | Amberg |
| 3,792,137 A | 2/1974 | Seto |
| 3,984,511 A | 10/1976 | Lammers |
| 4,187,276 A | 2/1980 | Amberg |
| 4,238,267 A | 12/1980 | Konstantin |
| 4,264,657 A | 4/1981 | Tollette |
| 4,332,635 A | 6/1982 | Holbrook et al. |
| 4,409,045 A | 10/1983 | Busse |
| 4,414,055 A | 11/1983 | Young |
| 4,479,770 A | 10/1984 | Slat et al. |
| 4,486,366 A | 12/1984 | Reddy |
| 4,528,221 A | 7/1985 | Komatsuzaki et al. |
| 4,555,381 A | 11/1985 | Chazal et al. |

(Continued)

FOREIGN PATENT DOCUMENTS

EP    0 395 585 A2    10/1990

(Continued)

OTHER PUBLICATIONS

Office Action issued on Dec. 7, 2010 in Canadian patent application No. 2,540,964 (2 pages).

(Continued)

*Primary Examiner* — Jeff Aftergut
*Assistant Examiner* — Jaeyun Lee
(74) *Attorney, Agent, or Firm* — Foley & Lardner LLP (57) ABSTRACT

A method and apparatus for producing labeled, plastic foam containers, such as a labeled EPS cup uses a heated pocket to thermally bond a label to a plastic cup. Also described is a labeled plastic foam container, such as a labeled EPS cup, having high quality printing capabilities, sufficient stiffness, acceptable insulation and barrier properties and reduced production cost.

36 Claims, 11 Drawing Sheets

U.S. PATENT DOCUMENTS

| | | | |
|---|---|---|---|
| 4,605,462 A | 8/1986 | Lehner | |
| 4,639,207 A | 1/1987 | Slat et al. | |
| 4,680,000 A | 7/1987 | Nowicki et al. | |
| 4,737,209 A | 4/1988 | Tomashauser et al. | |
| 4,806,197 A | 2/1989 | Harvey | |
| 4,832,775 A | 5/1989 | Park et al. | |
| 4,834,641 A | 5/1989 | Keyser | |
| 4,878,970 A | 11/1989 | Schubert et al. | |
| 4,909,723 A | 3/1990 | Slat et al. | |
| 4,973,241 A | 11/1990 | Keyser | |
| 4,976,803 A | 12/1990 | Tomashauer et al. | |
| 5,043,130 A | 8/1991 | Fujio | |
| 5,044,922 A | 9/1991 | Plenzler et al. | |
| 5,104,306 A | 4/1992 | Gordon et al. | |
| 5,129,984 A | 7/1992 | Tomashauser et al. | |
| 5,208,027 A | 5/1993 | Weder et al. | |
| 5,223,315 A | 6/1993 | Katsura et al. | |
| 5,266,149 A | 11/1993 | Collette et al. | |
| 5,368,798 A | 11/1994 | Mizukoshi et al. | |
| 5,470,420 A | 11/1995 | Yokajty | |
| 5,478,422 A | 12/1995 | Bright et al. | |
| 5,628,453 A | 5/1997 | MacLaughlin | |
| 5,788,905 A | 8/1998 | Miller et al. | |
| 5,879,496 A | 3/1999 | Bright et al. | |
| 5,908,590 A * | 6/1999 | Yoshimi et al. | 264/45.4 |
| 6,423,169 B1 | 7/2002 | Cobb | |
| 6,432,169 B1 | 8/2002 | Kluwe et al. | |
| 6,474,390 B1 | 11/2002 | Vandevoorde | |
| 6,490,093 B2 | 12/2002 | Guest | |
| 6,508,902 B2 | 1/2003 | Lind | |
| 6,718,664 B2 | 4/2004 | Williams | |
| 2003/0146549 A1 | 8/2003 | Dunlap et al. | |

FOREIGN PATENT DOCUMENTS

| | | |
|---|---|---|
| EP | 1 065 040 A2 | 1/2001 |
| FR | 2 229 612 | 12/1974 |
| GB | 1 391 371 | 4/1975 |
| GB | 1 441 666 | 7/1976 |

OTHER PUBLICATIONS

Canadian Intellectual Property Office action on application No. 2,540,964 dated Oct. 13, 2011; 2 pages.

* cited by examiner

METHOD AND APPARATUS FOR PRODUCING LABELED, PLASTIC FOAM CONTAINERS, AND PRODUCT OF SAME

CROSS-REFERENCE TO RELATED APPLICATIONS

This application is a continuation of U.S. application Ser. No. 11/227,124, filed Sep. 16, 2005, now abandoned, which is a continuation Application of PCT/IB2004/003517, filed Oct. 1, 2004, which application claims the benefit under 35 USC 119(e) of U.S. Application 60/507,944, filed Oct. 3, 2003, U.S. Application 60/510,519, filed Oct. 14, 2003. The respective disclosures of each of these related application are incorporated herein by reference in their entireties.

FIELD OF THE INVENTION

This invention relates to a method and apparatus for producing labeled, plastic foam containers, such as, for example, a labeled expanded polystyrene cup. It further relates to a labeled, plastic foam container, such as a labeled expanded polystyrene cup.

BACKGROUND OF THE INVENTION

Plastic foam containers, such as cups and other receptacles are widely used. Such containers can be made from different materials, including expanded polystyrene (EPS). Plastic foam containers, such as those made of EPS, are relatively inexpensive and have excellent insulating properties for holding both hot and cold fluids. Plastic foam containers, however, typically have poor printing capabilities. That is, it is difficult to apply print or graphical designs directly to the surface of plastic foam containers, such as EPS containers.

In order to improve aesthetics and other properties, it is desirable to apply a label to a plastic foam container. Traditional labeling devices suffer from certain limitations. For example, it is often complicated to apply labels to foam containers with conical surfaces, such as cups. It is particularly difficult to cover substantially the entire outer surface of such a container, such as the entire outer wall of a cup. It is also difficult to achieve proper and consistent bonding between the label and the cup.

It is therefore desirable to provide a process for forming a labeled plastic foam container in which: (1) labels are applied at sufficiently high speed; and (2) good bonding is obtained between the container and the label. In the latter case improving the bonding between the foam container and the label includes avoiding poor bonding, for example, from formation of air bubbles or loose edges; avoiding loose labels wrapped to the labeled foam container; and avoiding deformation on the geometries of the labeled foam container.

SUMMARY OF THE INVENTION

According to one aspect of the invention, a method for labeling a plastic foam container, includes: providing an unlabeled plastic foam container, made of, for example, EPS; positioning the plastic foam container onto a mandrel; applying a label to an exterior surface of the plastic foam container as the plastic foam container is positioned on the mandrel; positioning a cavity that corresponds substantially in shape to the outer surface of the plastic foam container relative to the mandrel onto which the container is positioned so as to substantially surround the exterior surface to which the label is applied; heating the plastic foam container at the exterior surface to which the label is applied with the cavity being at a sufficient temperature and for a time sufficient to bond the label to exterior surface of the container to provide a resulting labeled, plastic foam container; and removing the resulting labeled, plastic foam container from the mandrel. In a preferred embodiment, the plastic foam container is a plastic foam cup.

Preferably, the cavity is heated to a temperature in a range of about 135° C. to about 150° C. Heating may be accomplished by providing heating elements within the cavity. Alternatively, steam may be applied to the exterior of the cavity and/or input into the cavity.

According another feature of the invention, the cavity is used to apply pressure to the exterior surface to which the label is applied.

According to yet another feature of the invention, the cavity is formed within a metal cylinder that is positioned to move relative to the mandrel onto which the foam plastic container is positioned.

According to still another feature of the invention, the mandrel is provided on a rotating turret that moves the mandrel successively to: a first station at which the plastic foam container is placed on the mandrel; a second station at which the label is applied to the plastic foam container; and a third station at which the cavity is positioned to surround exterior surface of the plastic foam container to which the label is applied.

According to another feature of the invention, the label is affixed with at least one of a thermal agent, a hot melt, and/or a plastic coating. The plastic coating may comprise one or more of polyethylene, polypropylene, and any other suitable polymer or co-polymer or mixtures thereof.

According to another aspect of the invention, a machine for labeling plastic, foam containers comprises: a rotatable turret having a plurality of mandrels attached thereto. The turret is driven to rotate the mandrills to a plurality of stations, wherein the mandrels are configured to receive a plastic foam container, preferably from a cup feeder provided at a first station. The mandrels may be further configured to affix a label to a plastic foam container on one of the mandrels, preferably from a sleeve transfer device at a second station. The mandrels may be further configured to be received within a cavity that is so configured to be positioned over the outer surface of a plastic foam container that is placed on one of the mandrels, so as to substantially surround the exterior surface to which the label is applied at a third station.

According to another aspect of the invention, the method and apparatus according to the invention are used to manufacture labeled, plastic foam containers, wherein the label has good printing characteristics. Preferably, the label is formed of at least one of paper, aluminum or plastic film, and mixtures thereof. The person having ordinary skill in the art would understand the types of suitable materials for use in the label for the labeled foam containers according to the present invention.

According to a feature of the invention, a plastic foam container made according to a method or machine of the invention, prior to labeling, has relatively low density and stiffness, but after application of the label, has an overall stiffness and density that is comparable to similarly sized conventional foam containers. Preferably, the plastic foam container, prior to application of the label, has a density of less than 0.8 g/cm$^3$. More preferably, the plastic foam container, prior to application of the label, has a density in the range of about 0.041 to 0.076 g/cm$^3$. Preferably, the resulting labeled, plastic foam container has an overall density in the range of 0.05720-0.1888 g/cm$^3$.

According to another aspect of the invention, a labeled plastic foam container has an inner plastic foam portion having a density of less than 0.8 g/cm³, and an outer sleeve that adheres to an outer surface of said inner plastic foam portion. The outer sleeve has an outwardly facing surface to which is applied print or graphical designs, the outer sleeve providing stiffness to the inner portion. The label may be applied made according to a method or machine of the invention, prior to labeling, has relatively low density and stiffness, but after application of the label, has an overall stiffness and density that is comparable to similarly sized conventional foam containers.

According to a feature of the invention, the inner plastic foam portion defines a cup shape with a lip portion, bottom portion, and sidewall. Preferably, the inner plastic foam portion comprises EPS.

The stiffness obtained by the combination of plastic foam and label materials permits the use of substantially less EPS resin in comparison with a standard plastic foam container of comparable (or even less) volume capacity. The particular combination of a lower resin content, such as EPS resin, combined with a sleeve providing improved rigidity results in a container having a significantly lower cost than prior containers made out of paper and/or plastic. The outer sleeve dramatically improves printability in comparison to standard foam containers. This may result in particular by using a pre-printed label. Further, the container according to the invention further provides comparable or improved stiffness, barrier properties and insulation in comparison with comparable sized-containers.

Other features and advantages of the invention will be apparent from the following

DETAILED DESCRIPTION OF THE PREFERRED EMBODIMENT

The following describes machines for labeling plastic foam containers, and a process for using such machines, in accordance with various embodiments of the present invention. It should be appreciated, however, that the following description is intended to be merely exemplary of the various features of the invention and should not limit the proper scope of the appended claims.

Figure 1:
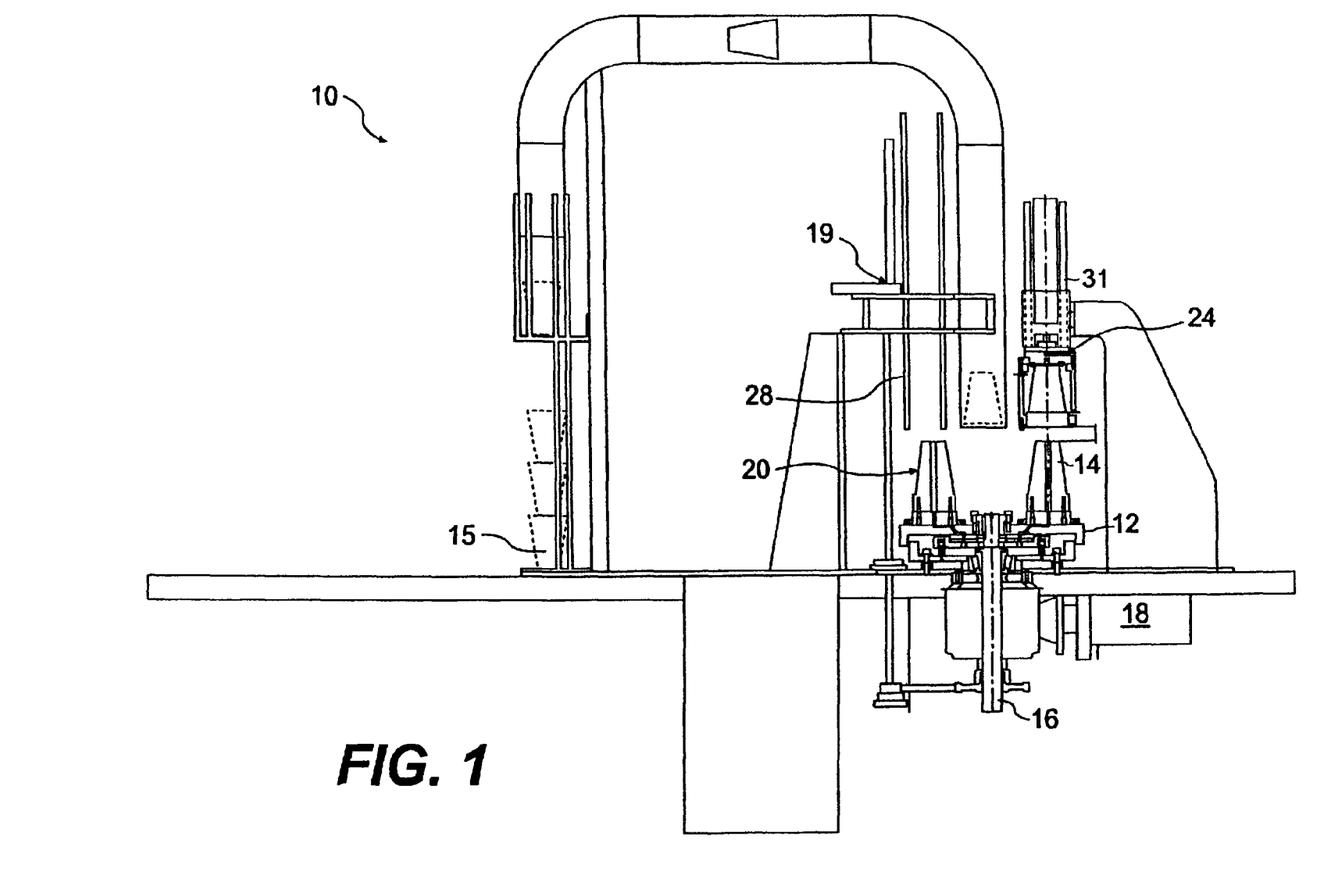
FIG. 1 is a schematic view of a machine for labeling a plastic foam container in accordance with a first embodiment of the invention.

FIG. 1 is a schematic view of a machine 10 for forming a labeled plastic foam container 15 in accordance with a first embodiment of the invention. As illustrated, the machine 10 includes a turret 12 having a plurality of mandrels 14 attached thereto. Each mandrel 14 has a tapered shape and is configured to receive a plastic foam container 17, which is preferably an EPS cup.

Figure 2:
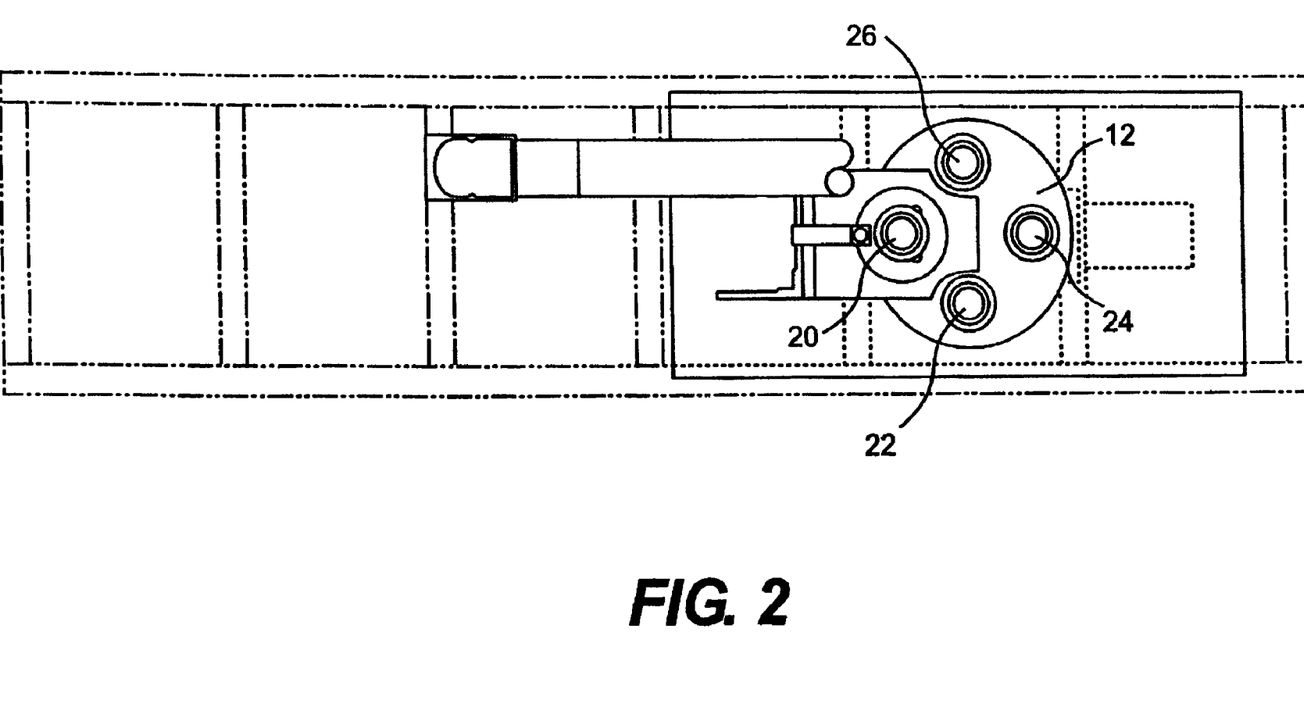
FIG. 2 is a top view of the labeling machine in accordance with a first embodiment of the present invention showing the location of the mandrels on the turret.

The turret 12 of this example is driven by a shaft 16, which is operatively connected to an index drive 18, of a type conventionally known in the art. The index drive 18 rotates the turret 12 by 90 degrees so as to precisely align the mandrels 14 at each of the stations 20, 22, 24, 26 as illustrated in FIG. 2, which illustrates a top view of the labeling machine in accordance with a first embodiment of the present invention showing the location of the mandrels 14 on the turret 12. While four stations are shown, it will be appreciated that a any number of stations may be provided in the machine 10.

As illustrated in FIG. 1, at a first station 20 unlabeled plastic foam containers 17 are placed onto the mandrels 14 from the cup dispensing apparatus 19 via an actuator 28. The cup dispensing apparatus may include a rotating turret that automatically loads the unlabeled plastic foam containers 17 onto the mandrels 14. At a second station 22, the label 13 is applied to the plastic foam container 17 as discussed in more detail below. At a third station 24, the label 13 is bonded to the plastic foam container 17 to form the labeled plastic foam container 15. The labeled plastic foam container 15 is removed from the mandrel 14 at a fourth station 26.

Figure 3:
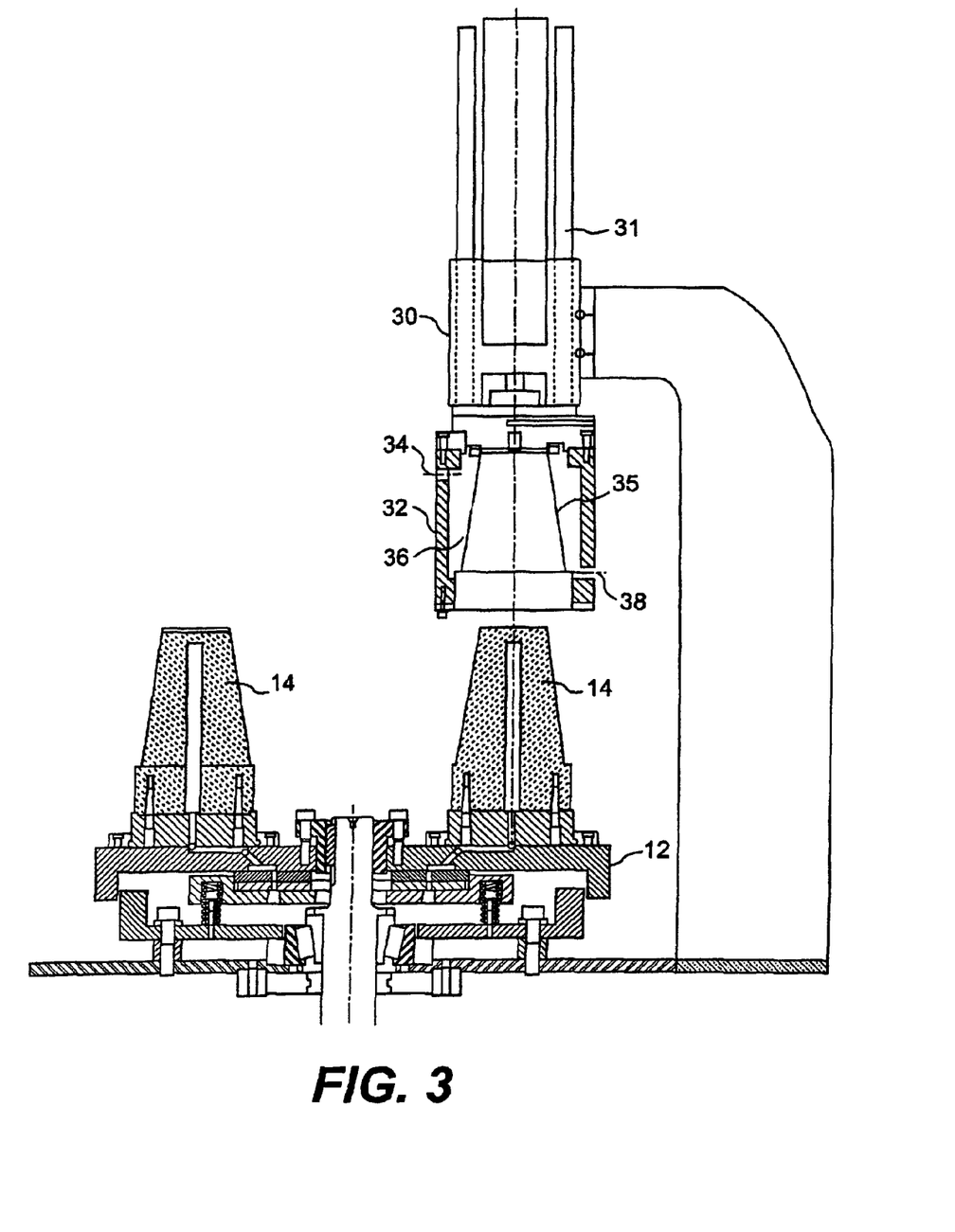
FIG. 3 is a cross-sectional view of a labeling machine in accordance with a first embodiment, illustrating a device having a heated cavity positioned above a mandrel.

Reference is now made to FIG. 3. At a third station 24, there is provided a work piece 30, formed as a metal cylinder. The work piece 30 attaches to a vertical shaft 31 which is driven pneumatically, according to techniques known in the art, to raise and lower as illustrated in FIGS. 1 and 3. In accordance with one feature of the invention, the work piece 30 has a cavity or pocket 32 formed within it. In this embodiment, the open end of the cavity faces downward toward the turret 12.

The cavity or pocket 32 has a tapered shape, configured to conform to the outer dimensions of a plastic foam container disposed on a mandrel 14. The cavity or pocket 32 is configured in conformance with the shape of the mandrels 14. As illustrated in FIGS. 1 and 3, a pneumatic piston drives the cavity vertically (upward and downward in this view) toward an opposing mandrel 14 disposed beneath the cavity 32.

According to a feature of the invention, the cylindrically-shaped work piece 30 that includes the cavity 32 is heated so that it can be used to bond a label to a plastic foam container disposed on a the mandrel 14. In this example, the work piece 30 is connected to a steam inlet line 34. Steam is fed through the steam inlet line 34 to the interior 36 of the cylindrically-shaped piece 30, by which the inner surface 35 of the cavity 32 may be rapidly heated. Application of steam may be controlled automatically, for example, with a controller actuated valve (not shown) and steam condensate is removed via steam condensate line 38. While it has been found that steam heating provides many advantages, particularly rapid heating, other techniques for heating the cavity are possible, such as electric or gas heaters, or other heating elements. Such devices can be adapted to achieve similar results but will, of course, typically involve different energy costs and yields. It has been found that the use of steam is particularly advantageous for use with EPS containers due to its efficiency. Further, steam is typically used in manufacturing EPS containers and is therefore readily available.

Optionally, the work piece 30 may be configured to be driven downward to apply pressure to a plastic foam container 17 and label 13 disposed on the mandrel 14. Pressure may be applied mechanically or by air pressure. It has been found that application of pressure promotes quicker and more homogenous bonding between the label 13 and the foam container 17. Further, it has been found that heat transfer to bond containers to the labels 13 is improved by using air pressure or mechanical pressure inside the pocket.

At a fourth station 26, labeled foam containers 15 are removed from the turret 14. Removal may be accomplished by techniques well known in the art, such as, for example, suction.

Figure 4:
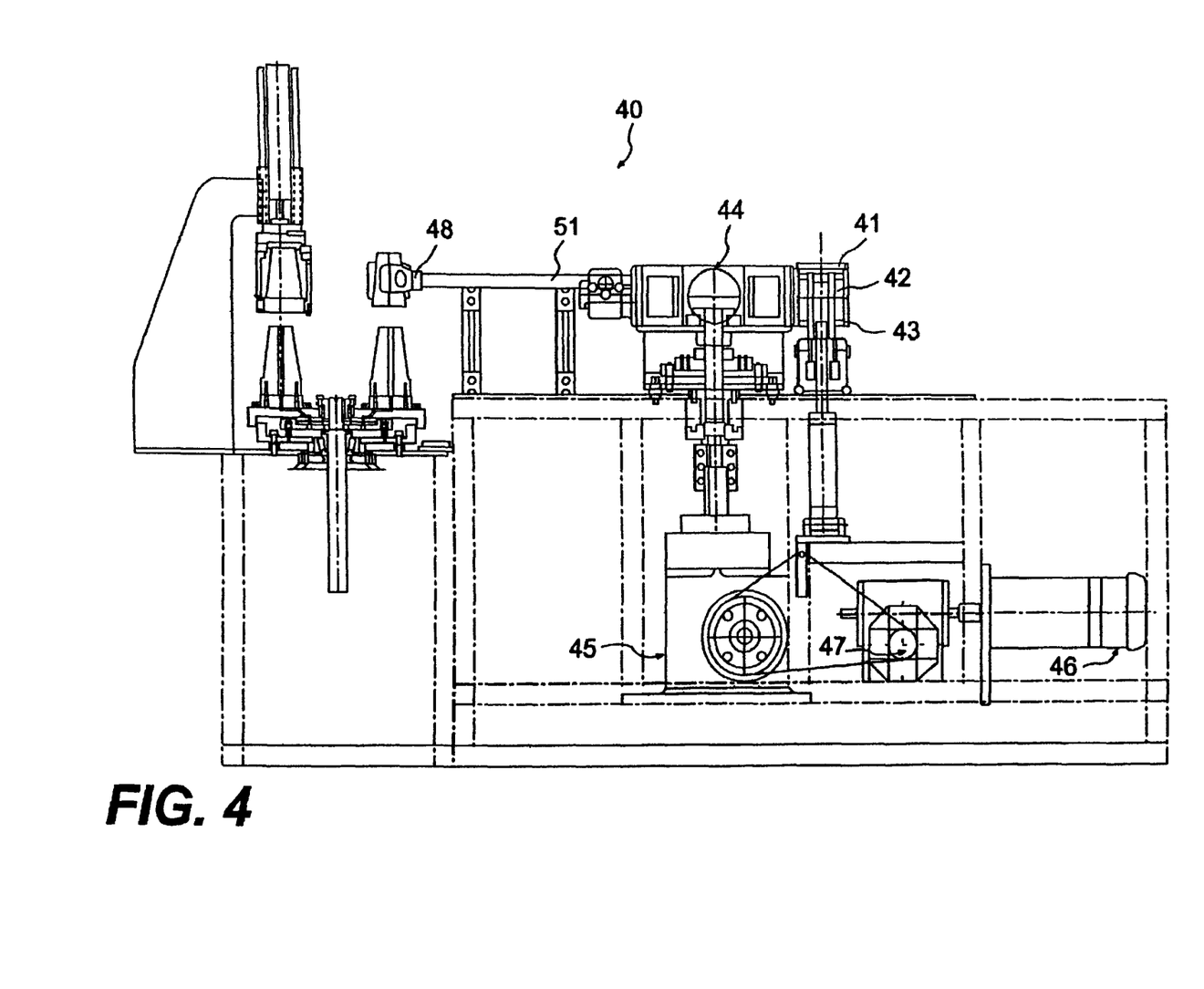
FIG. 4 is a side perspective view of a labeling machine in accordance with a first embodiment of the present invention.
Figure 5:
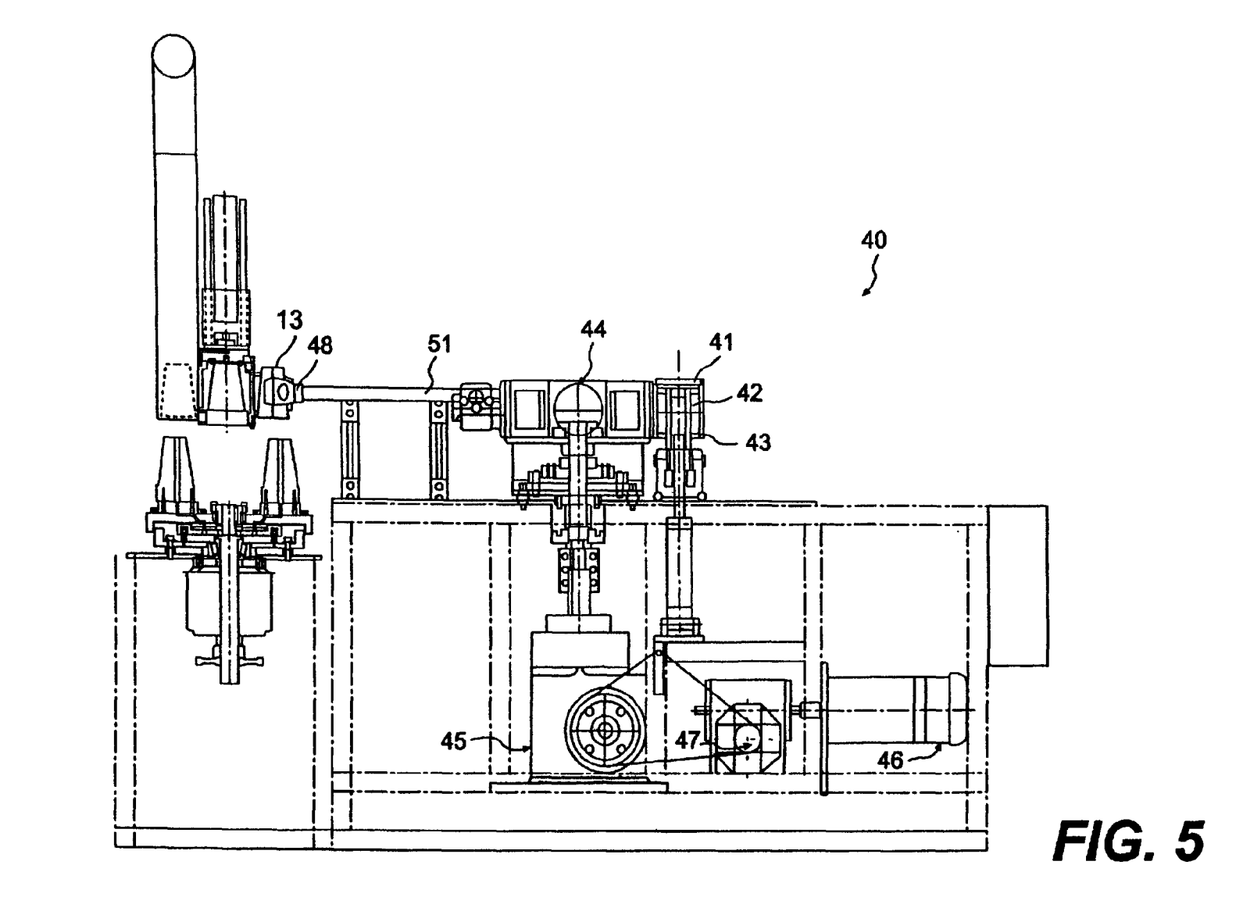
FIG. 5 is a side perspective view of a labeling machine in accordance with a first embodiment of the present invention.
Figure 6:
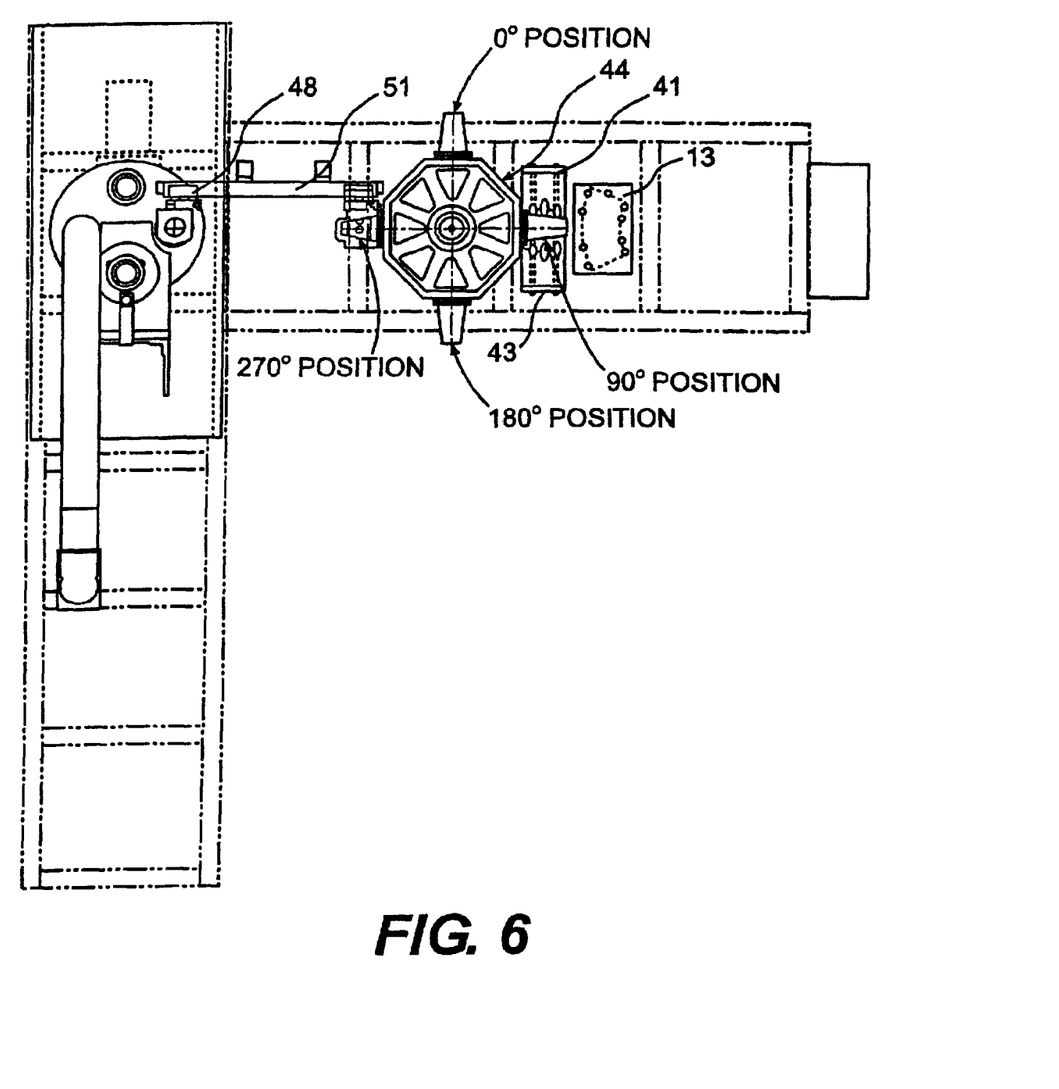
FIG. 6 is a top perspective view of a sleeve transfer device in accordance with a first embodiment of the present invention.

Reference is now made to FIGS. 4, 5 and 6. The sleeve transfer device 40 inserts the label 13 onto the unlabeled plastic foam cup 17 that has already been placed on the mandrel 14 at the first station 20. The mechanism illustrated in the figure is conformed for a rotating table 44 driven from an index device 45 having, for example, four positions. The index device 45 is driven by an electric drive 46 which may include a gear box 47. The index device 45 may have four positions. At the 90° position, unfolded labels 13 are wrapped in a mandrel 42 by two cone shaped revolving wings 41, 43. The sleeve is held to the mandrel 42 by a vacuum and the seam of the label 13 is formed. The rotating table 44 is then moved to the 180° position for cooling the labels 13 and then moved to the 270° position where vacuum is turned off and the label 13 is released from the mandrel 42 to the transfer pocket 48 horizontally. The label 13 is affixed to the transfer pocket 48 by vacuum and moved by a pneumatic linear cylinder 51 to rotate the label 13 90° so as to position the label 13 over the mandrel 14 at the second station 22 for applying the label 13 to the foam container 17. The vacuum in the transfer pocket 48 is turned off to deliver the label 13 to the foam container 17 in the second station 22.

In operation, an unlabeled plastic foam cup, preferably made of EPS, is placed on a mandrel 14 at the first station 20. The turret 12 indexes by 90 degrees, forwarding the unlabeled container 17 to the second station 22, at which a label 13 is applied to an exterior surface of the plastic foam container 17 to form the labeled foam container 15. The turret 12 indexes an additional 90 degrees, forwarding the plastic foam container with the unbonded label 13 to the third station 24. At the third station, the heated cavity 32 is lowered over the mandrel 14 onto which the foamed container 17 is positioned, so as to substantially surround the exterior surface to which the label 13 is applied. The cavity 32 heats the plastic foam container 17 at the exterior surface to which the label 13 is applied, at a temperature and a time sufficient to bond the label to exterior surface of the foamed container 17 to form the labeled foam container 15. The resulting labeled, plastic foam container 15 is indexed to the fourth station 26, at which it is removed from the turret 12 and the mandrel 14.

Preferably, the cavity 32 is heated to a temperature in a range of about 135° C. to about 150° C. It has been found that heating above 170° C. is not preferred, as higher temperatures tend deform the container shape and geometry, although temperature ranges will vary depending on the composition of the container, as well as the label and any bonding agent that are used.

Preferably, the label 13 is affixed with at least one of a thermal agent, a hot melt, and a plastic coating. The plastic coating may comprise one or more of polyethylene, polypropylene, and any other suitable polymer or co-polymer or mixtures thereof Various labels 13 may be used with the invention. These include, for example, polypropylene and polyethylene films, paper, coated papers, aluminum or plastic film, and metallic laminations. Preferably, the label has good printing characteristics to provide improved aesthetic appearance. The person having ordinary skill in the art would understand the types of suitable materials for use in the label for the labeled foam containers according to the present invention.

It will be appreciated that systems according to the invention may be modified in many ways. For example, while the machine 10 has been described with reference to the above figures with the mandrels being disposed horizontally with respect to their longitudinal axes, i.e., in a vertical orientation. It should be understood that the machine can be configured such that the mandrels may be disposed vertically with respect to their longitudinal axes, i.e., in a horizontal orientation.

One advantage to the invention is its speed and accuracy. Embodiments have been constructed by modification of conventional machines used to manufacture paper cups. Such machines are particularly suited for high-speed manufacturing, in which a paper cut-out is wrapped to forms the sides of a container and a bottom portion is formed. The container is then disposed in a cavity with its upper portion exposed so the rim may be formed. Conventionally, however, the cavity used for forming the rim of a paper cup, is not heated.

As noted above, application of air or mechanical pressure enhances heat transfer, thus increasing machine and process speed. The optimal amount of pressure differs depending on, for example, the size of the cup/container needed to be labeled. Further, the amount of pressure is limited to a point where the cup/container can be partially collapsed and deformed.

It has been found that, in comparison with conventional labeling machines, the present invention is better suited to applying a label to a greater surface area. This is particularly true for containers, such as cups, having conical surfaces.

More particularly, trials conducted with the present invention have demonstrated that the present invention provides improved bonding in comparison with conventional labeling systems, when applied to EPS cups. In particular, the cups made with the invention exhibit good bonding characteristics.

According to a preferred feature, the invention ma be used to manufacture a labeled foam cup with excellent aesthetic appearance, while maintaining acceptable cost, stiffness, and barrier characteristics.

Figure 7:
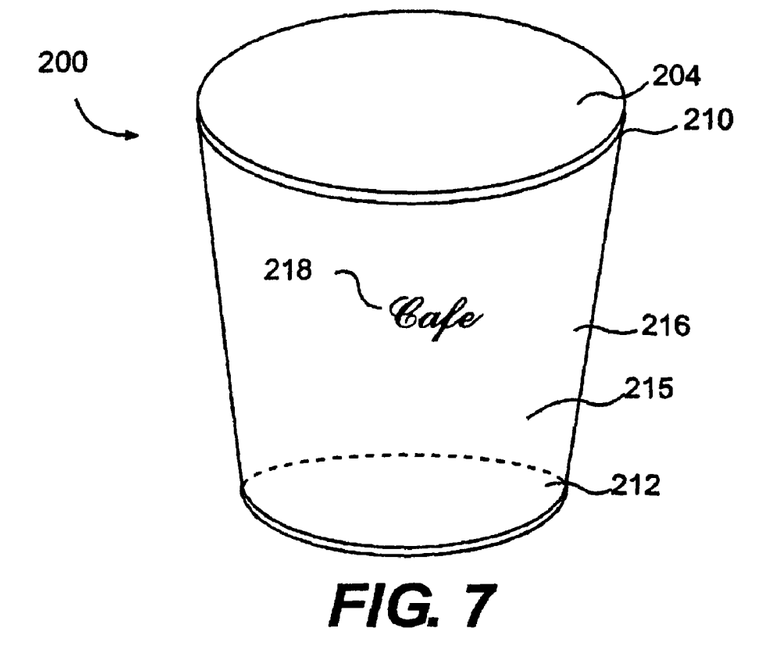
FIG. 7 is a perspective view of a labeled, plastic foam container made in accordance with one embodiment of the invention.

FIG. 7 is a perspective view of a container according to the invention, which is a cup 200 in this particular example. The cup 200 comprises an inner portion 204 made of a plastic foam, such as EPS. The inner portion 204 defines the shape of the cup 200, including a lip 210, bottom 212 and sidewall 215. Affixed to the inner portion 214 is an outer sleeve 216, which in this particular example comprises a paper label with stylized indicia "Café" 218 Although a cup is shown, it will be appreciated that other types of containers, such as soup bowls, cartons or other containers, may also be provided.

The paper label 216 has excellent printability in comparison with standard foam products. While a paper label is illustrated in this example, the sleeve according to the invention may comprise other suitable materials known in the art, such as metal foils or plastic films. Preferably, containers according to the invention utilize paper and/or plastic films of basis weights that range: 17.5 g/m² up to 200 g/m².

The label 216 is bonded to the inner foam portion 214 using a thermo-adhesive according to standard techniques known in the art. Other bonding agents may be used, including thermal activated agents, hot melts, plastic coatings (such as polyethylene, polypropylene, and other polymers) and other agents known in the art. It is noted that the particular bonding agent used may increase the overall stiffness and performance of the container.

According to a feature of the invention that the amount of plastic resin used in the foam portion to which a label is affixed is significantly less than standard, comparably sized and shaped plastic foam containers. This is achieved by lowering the density of the foam portion to which the label is affixed. Alternatively, the foam portion to which the label is affixed may have smaller thickness than standard, comparably sized and shaped plastic foam containers.

Figure 8:
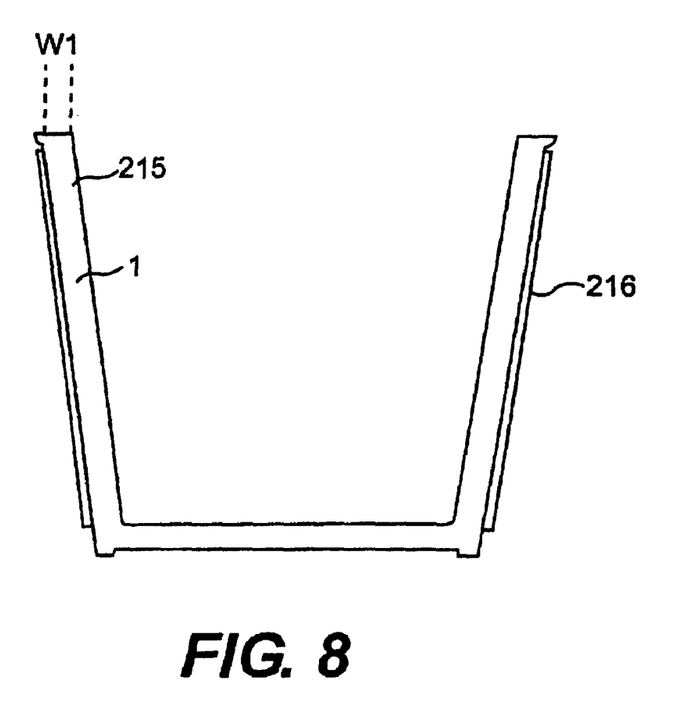
FIG. 8 is a cross-sectional view of a labeled plastic foam container, wherein the foam wall of the container has reduced wall thickness.

FIG. 8 is a cross-sectional view of a cup according to an embodiment of the invention. As illustrated, the plastic foam wall portion 215 to which the label 216 is affixed has a thickness W1. It also has a density $\rho 1$. In this example, W1 is much thinner than the thickness W3 of the wall of a conventional foam cup, such as shown in FIG. 10.

Figure 9:
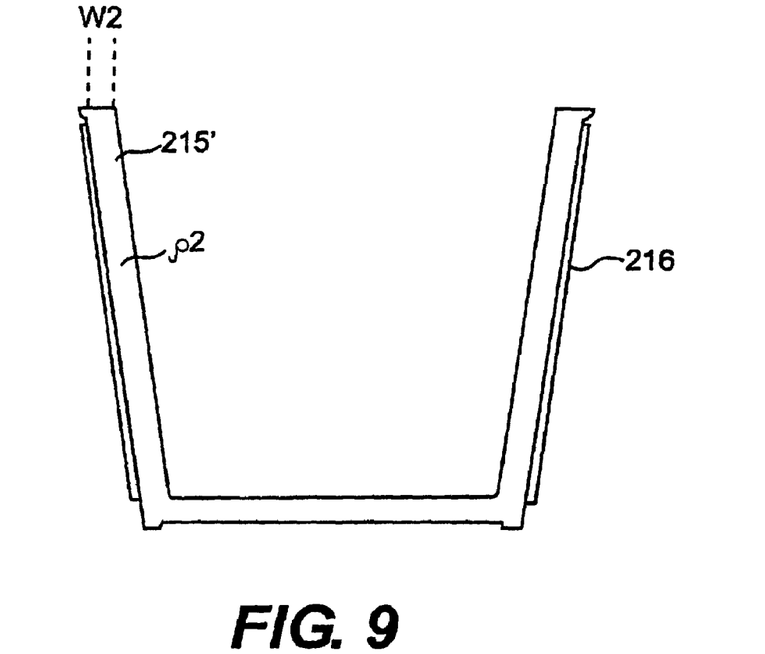
FIG. 9 is a cross-sectional view of a labeled plastic foam container, wherein the foam wall of the container has reduced density.

FIG. 9 is a cross-sectional view of a cup according to another embodiment of the invention. In this example, the plastic foam wall portion 215' has a thickness W2 that is comparable to the thickness W3 of a standard foam cup, such as shown in FIG. 10. However the cup of FIG. 9 has a density $\rho 2$ that is less than the density $\rho 3$ of a standard foam cup, such as shown in FIG. 10.

Although a thin walled cup and a low density foam cup are shown as separate embodiments, it should be understood that a cup according to the invention may combine these features.

Figure 10:
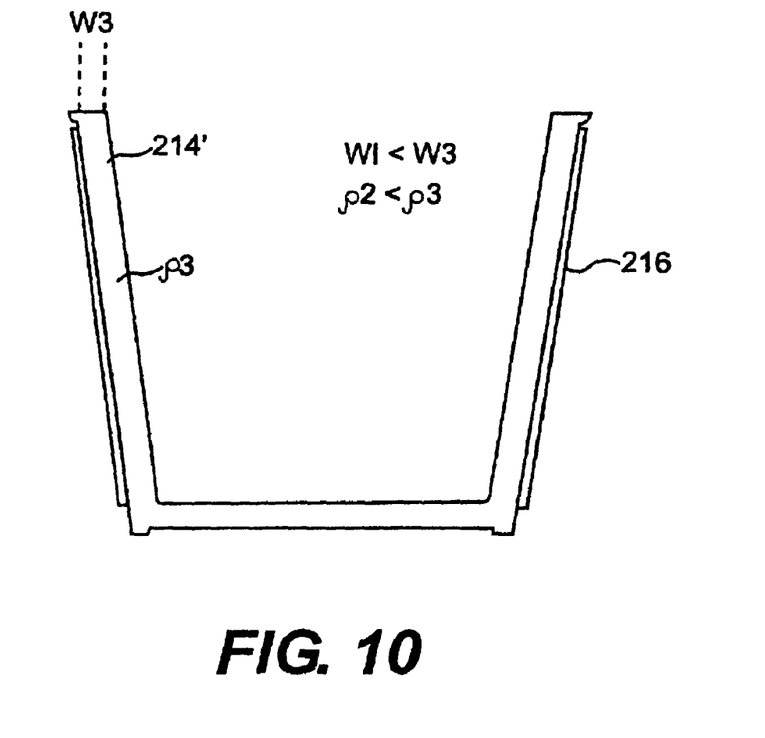
FIG. 10 is an illustrative cross-sectional view of a standard foam container with optional label.

FIG. 10 is a cross-sectional view of a standard foam cup. The foam cup of FIG. 10 has a similar capacity and inner shape as the cups of FIGS. 8 and 9. Affixed to the walls is an optional label 216. The wall 214 of the standard foam cup has a thickness W2 and a density $\rho 2$.

Due to the smaller relative density and/or the smaller relative thickness, of the portion that is covered by the outer sleeve, containers according to the invention utilizes less resin than a comparably sized and shaped standard foam container.

Experimentally, comparisons have been performed between various containers according to the invention and comparable conventional containers. It has been found that an effective range of densities for the wall of the inner foam portion of a labeled, molded foam containers according to the invention (having capacities of from 4 ounces to 175 ounces) is less than about 0.08 g/cm³, or more preferably, about 0.0410 to 0.0759 g/cm³. In comparison, a 10 ounce cup made by Autonational, identified above, has a density of about 0.1200-0.1460 g/cm³, as measured with the label removed. Accordingly, even relatively larger containers according to the present invention have a substantially lower foam density and thus require a substantially lower amount of foam resin.

As shown below, thinner or less dense foam containers with no outer sleeve have significantly reduced overall rigidity. Thinner or less dense foam containers are also more susceptible to permeation by materials in the container. It has been found, however, that the use of appropriate outer sleeve compensates for the reduction in rigidity and improves barrier properties. The provision of a sleeve comprised of suitable material, such as paper, provides for improved printability.

Figure 11A:
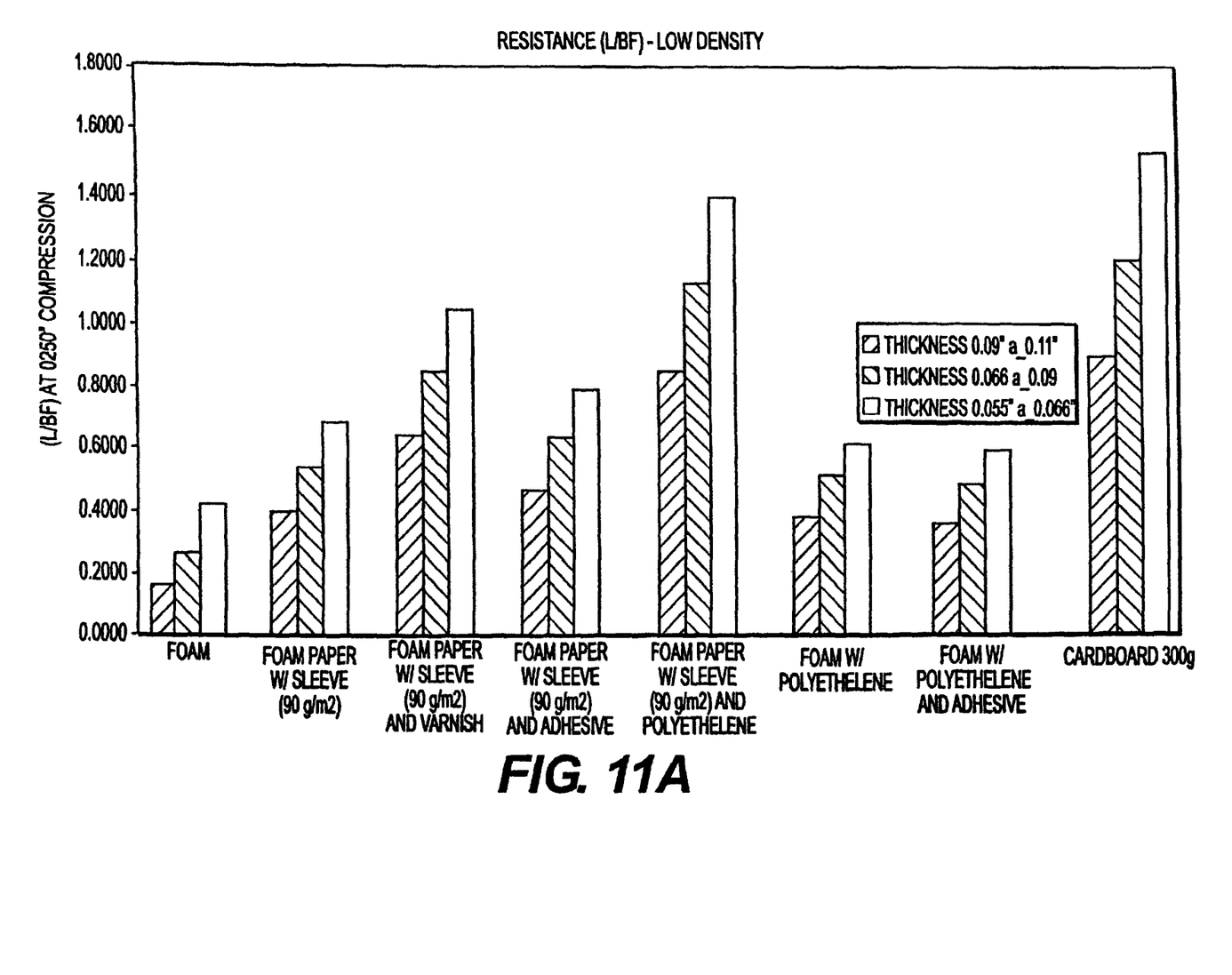
FIGS. 11A-11C are graphical, comparative representation of the densities of plastic foam containers and labeled plastic foam containers.
Figure 11B:
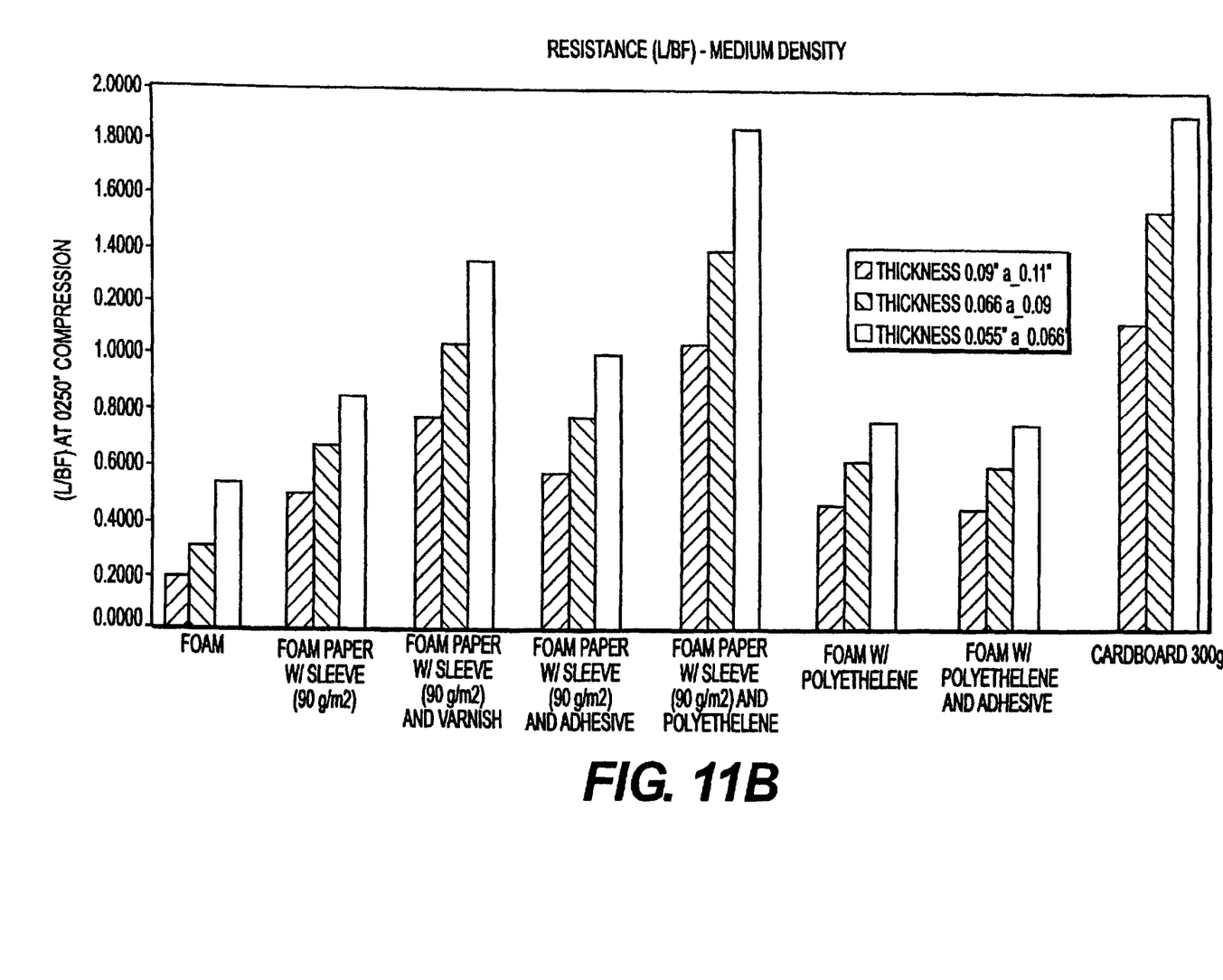
Figure 11C:
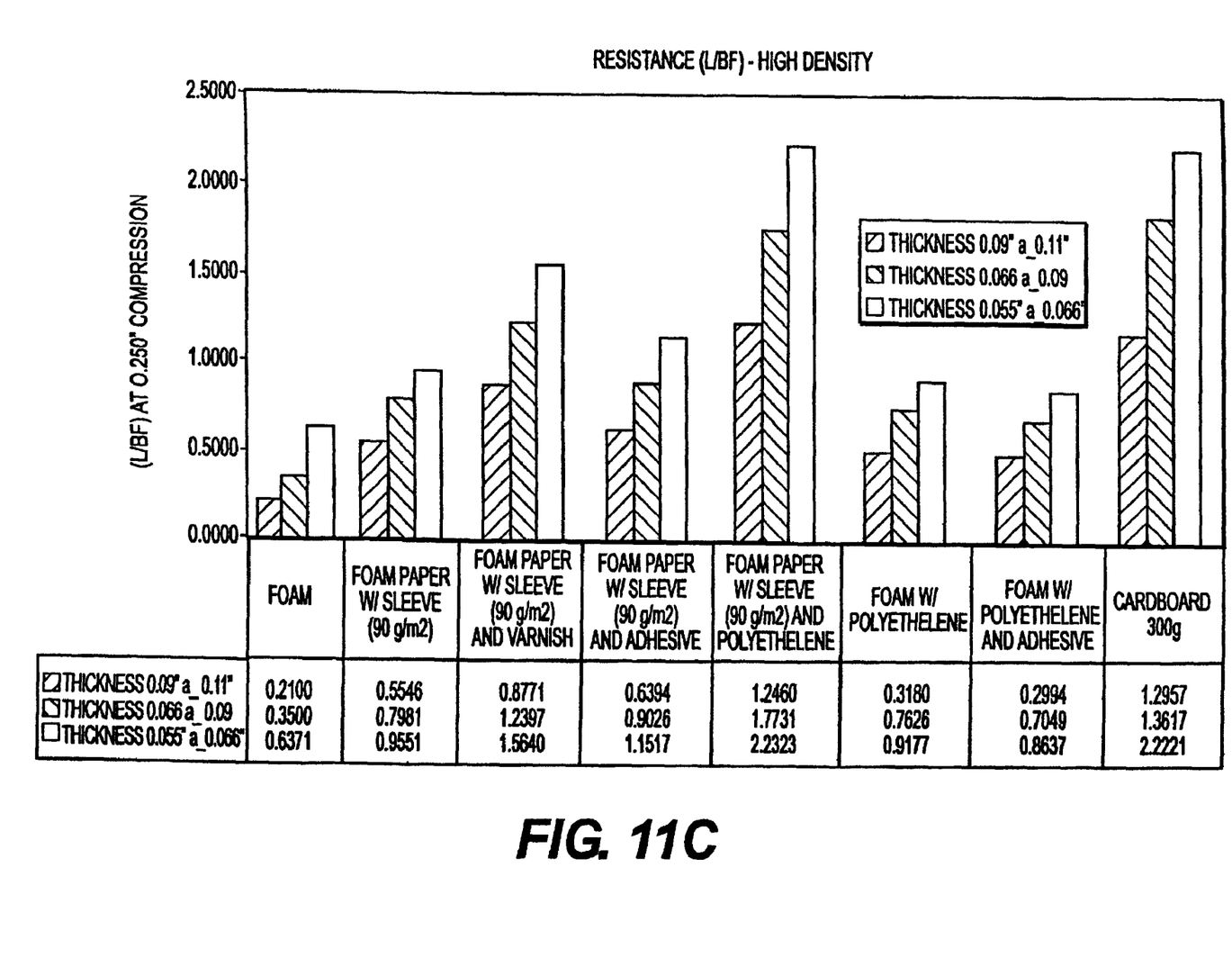

Experiments have been performed with various containers that include a molded foam portion, over which a label or sleeve is applied. As noted above, it has been found that containers with acceptable properties have an inner foam portion (i.e., the without the label or sleeve) having densities in the range of 0.0410-0.0579 g/cm³. By provision of the label sleeve, the finished containers overall have densities of 0.0572-0.1888 g/cm³, which are comparable to standard foam cups that are more expensive due to their use of more resin. These measurements were made on a range of containers with varying capacity using a standard density measurement kit YDK 01LP sold by Sartorious AG. The results are depicted in FIGS. 11A-11C.

As noted above, different types of labels may be applied in connection with containers according to the invention, including cups having molded foam inner portions and various types of labels, such as a 300 g/m2 paper or board label, and a polypropylene label. Other containers may include a plastic foam soup container with couche (type of paper) and polyethylene 1 sided coated paper label, a plastic foam cup with paper bonded with a first thermal agent, a plastic foam cup with a paper label, varnish and a thermal agent, and a plastic foam cup with a polypropylene film label and adhesive.

From the foregoing description, it should be apparent to those skilled in the art that the present invention provide labeled containers/cups having the following advantages: cost efficiency; high quality printing capabilities; sufficient stiffness; insulation and barrier properties; minimum amount of raw materials; and efficient stacking. In particular the present invention provides substantial cost savings through the use of lower amounts of resin in comparison with standard foam containers that provide comparable performance.

Although the invention has been described in reference to specific embodiments and examples, it will be appreciated by those skilled in the art that the present invention can be embodied in other forms without departing from the spirit and scope of the invention. The presently disclosed embodiments should therefore be considered in all respects illustrative and not restrictive.

What is claimed is:

1. A method for labeling a plastic foam container comprising:
   automatically positioning an unlabeled, preformed plastic foam container onto a mandrel at a first station;
   applying a label to an exterior surface of the plastic foam container at a second station;
   heating a work piece that defines a cavity that corresponds in shape to the outer surface of the plastic foam container;
   positioning the work piece so that the cavity surrounds the exterior surface of said plastic foam container to which the label is applied at a third station;
   heating the exterior surface of the plastic foam container to which the label is applied with said cavity by conductive heat transfer from the work piece to the exterior surface of the plastic foam container as the plastic foam container is disposed within the cavity, at a temperature and a time sufficient to bond the label to exterior surface of the container to provide a resulting labeled, plastic foam container; and
   removing the resulting labeled, plastic foam container from the mandrel.

2. The method of claim 1, wherein automatically positioning an unlabeled, preformed plastic foam container includes automatically loading said unlabeled, preformed plastic foam containers with an indexing turret.

3. The method of claim 1, wherein the cavity is heated to a temperature in a range of 135° C. to 150° C.

4. The method of claim 1, wherein the cavity is heated with heating elements that are in thermal contact with the surface of the cavity.

5. The method of claim 1, wherein the cavity is heated by applying steam to the cavity.

6. The method of claim 1, further comprising applying pressure to the exterior surface to which the label is applied with the cavity.

7. The method of claim 1, wherein the work piece comprises a metal cylinder that is positioned to move relative to the mandrel onto which the container is positioned.

8. The method of claim 1, wherein the mandrel is provided on a rotating turret that moves the mandrel successively to the first station at which the plastic foam container is placed on the mandrel, the second station at which the label is applied to the plastic foam container, and the third station at which the cavity is positioned to surround exterior surface of the plastic foam container to which the label is applied.

9. The method of claim 8, wherein the work piece comprises a metal cylinder that is positioned at the third station to move relative to the mandrel onto which the plastic foam container is positioned.

10. The method of claim 1, wherein the label is affixed to said plastic foam container with at least one of a thermal agent, a hot melt, or a plastic coating.

11. The method of claim 10, wherein the plastic coating comprises at least one of polyethylene or polypropylene.

12. The method of claim 1, wherein the plastic foam container, prior to application of the label, has a density of less than 0.08 g/cm$^3$.

13. The method of claim 12, wherein the plastic foam container, prior to application of the label, has a density in the range of 0.041 to 0.076 g/cm$^3$.

14. The method of claim 12, wherein the resulting labeled, plastic foam container has an overall density in the range of 0.05720-0.1888 g/cm$^3$.

15. The method of claim 1, wherein the label comprises at least one of paper, aluminum or plastic film.

16. The method of claim 1, wherein said plastic foam container is a cup.

17. The method of claim 16, wherein the plastic foam cup comprises EPS.

18. A method for labeling a plastic foam container comprising:
    applying a label to an exterior surface of an unlabeled, preformed plastic foam container of the plastic foam container;
    heating a work piece that defines a cavity that corresponds in shape to the outer surface of a plastic foam container;
    positioning the work piece so that the cavity surrounds the exterior surface of said plastic foam container to which the label is applied;
    heating the exterior surface of the plastic foam container to which the label is applied with said cavity by conductive heat transfer from the work piece to the exterior surface of the plastic foam container as the plastic foam container is disposed within the cavity, at a temperature and a time sufficient to bond the label to exterior surface of the container to provide a resulting labeled, plastic foam container; and
    removing the resulting labeled, plastic foam container.

19. The method of claim 18, further comprising automatically positioning an unlabeled, preformed plastic foam container includes automatically loading said unlabeled, preformed plastic foam containers with an indexing turret.

20. The method of claim 18, wherein the cavity is heated to a temperature in a range of 135° C. to 150° C.

21. The method of claim 18, wherein the cavity is heated with heating elements that are in thermal contact with the surface of the cavity.

22. The method of claim 18, wherein the cavity is heated by applying steam to the cavity.

23. The method of claim 18, further comprising applying pressure to the exterior surface to which the label is applied with the cavity.

24. The method of claim 18, wherein the work piece comprises a metal cylinder that is positioned to have coaxial relative motion with the plastic foam container.

25. The method of claim 18, wherein the container is positioned on a mandrel provided on a conveying device that aligns the mandrel to be coaxial with the cavity.

26. The method of claim 18, wherein the container is positioned on a mandrel provided on a rotating turret that moves the mandrel successively to a first station at which the plastic foam container is placed on the mandrel, a second station at which the label is applied to the plastic foam container, and a third station at which the cavity is positioned to surround exterior surface of the plastic foam container to which the label is applied.

27. The method of claim 26, wherein the work piece comprises a metal cylinder that is positioned at the third station to have coaxial relative motion with the mandrel.

28. The method of claim 18, wherein the label is affixed to said plastic foam container with at least one of a thermal agent, a hot melt, or a plastic coating.

29. The method of claim 28, wherein the plastic coating comprises at least one of polyethylene or polypropylene.

30. The method of claim 18, wherein the plastic foam container, prior to application of the label, has a density of less than 0.08 g/cm3.

31. The method of claim 30, wherein the plastic foam container, prior to application of the label, has a density in the range of 0.041 to 0.076 g/cm3.

32. The method of claim 30, wherein the resulting labeled, plastic foam container has an overall density in the range of 0.05720-0.1888 g/cm3.

33. The method of claim 18, wherein the label comprises at least one of paper, aluminum or plastic film.

34. The method of claim 18, wherein said plastic foam container is a cup.

35. The method of claim 34, wherein the plastic foam cup comprises EPS.

36. The method of claim 1, wherein the work piece is heated by applying steam into an interior portion of the cavity such that the steam directly contacts an inner surface of the cavity adjacent to the exterior surface of the plastic foam container to which the label is applied.

* * * * *